No. 857,636. PATENTED JUNE 25, 1907.
G. F. LEIGER.
SPEED REGULATING MECHANISM.
APPLICATION FILED MAR. 11, 1907.
3 SHEETS—SHEET 1.
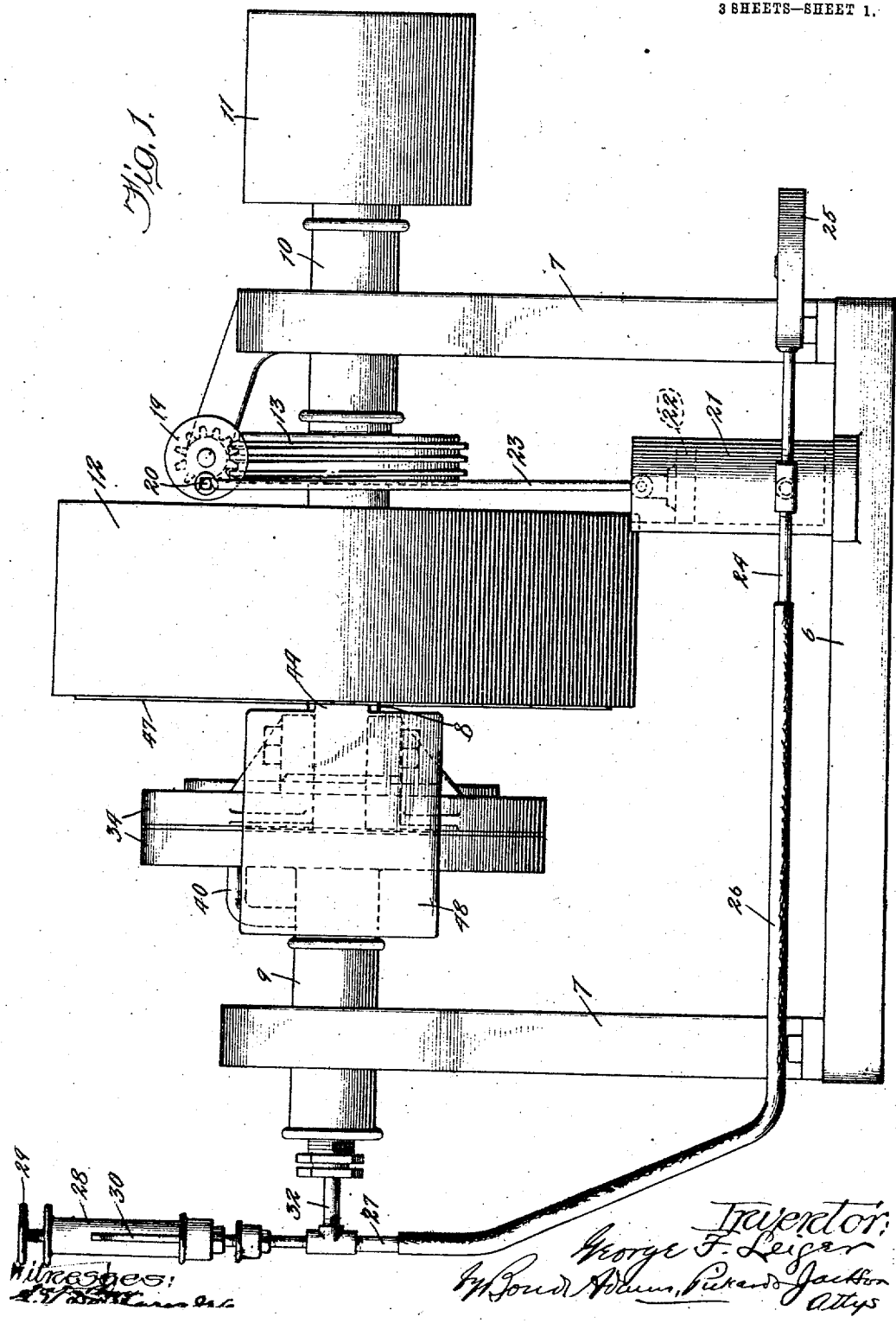

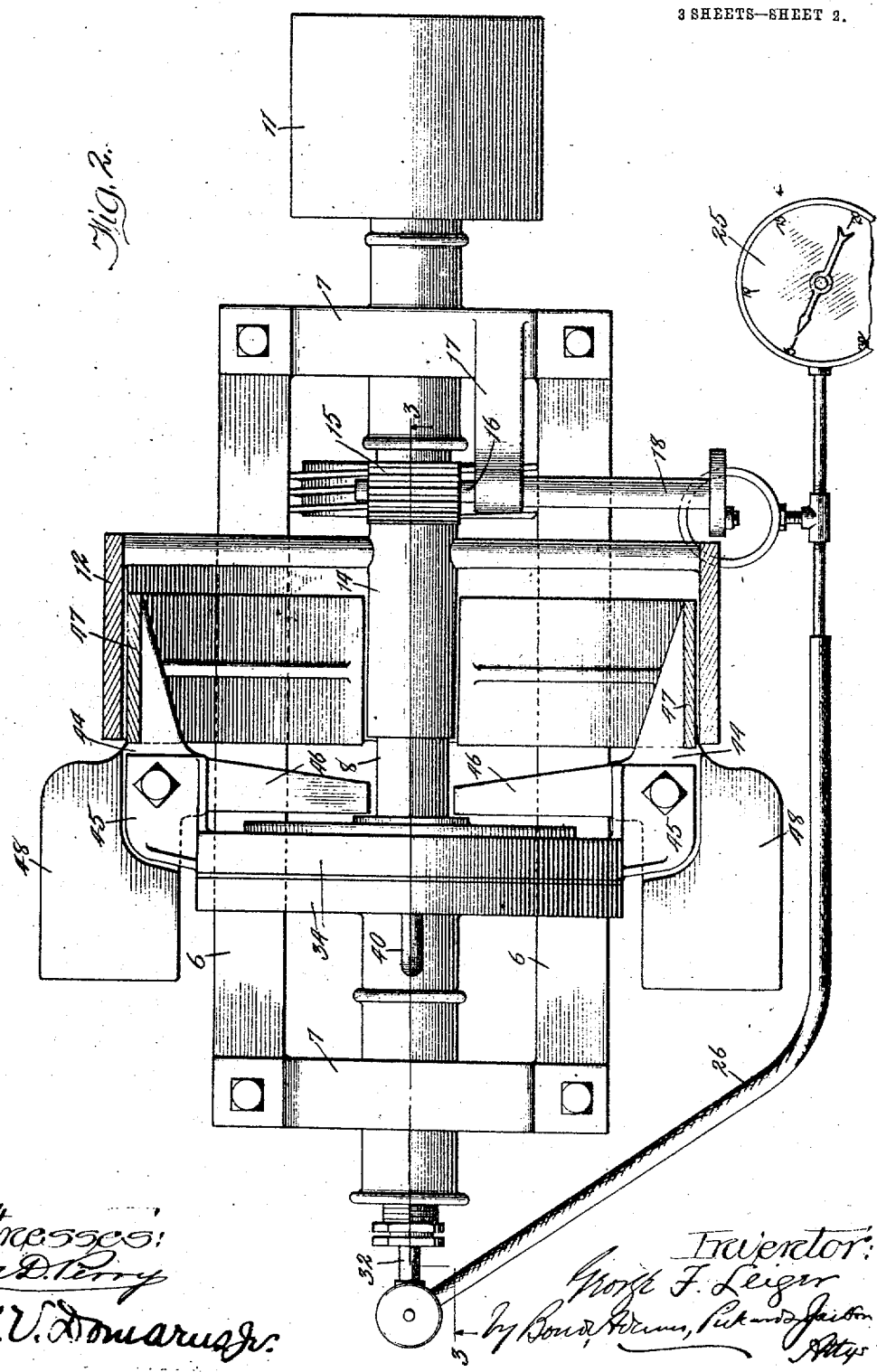

No. 857,636. PATENTED JUNE 25, 1907.
G. F. LEIGER.
SPEED REGULATING MECHANISM.
APPLICATION FILED MAR. 11, 1907.
3 SHEETS—SHEET 3.
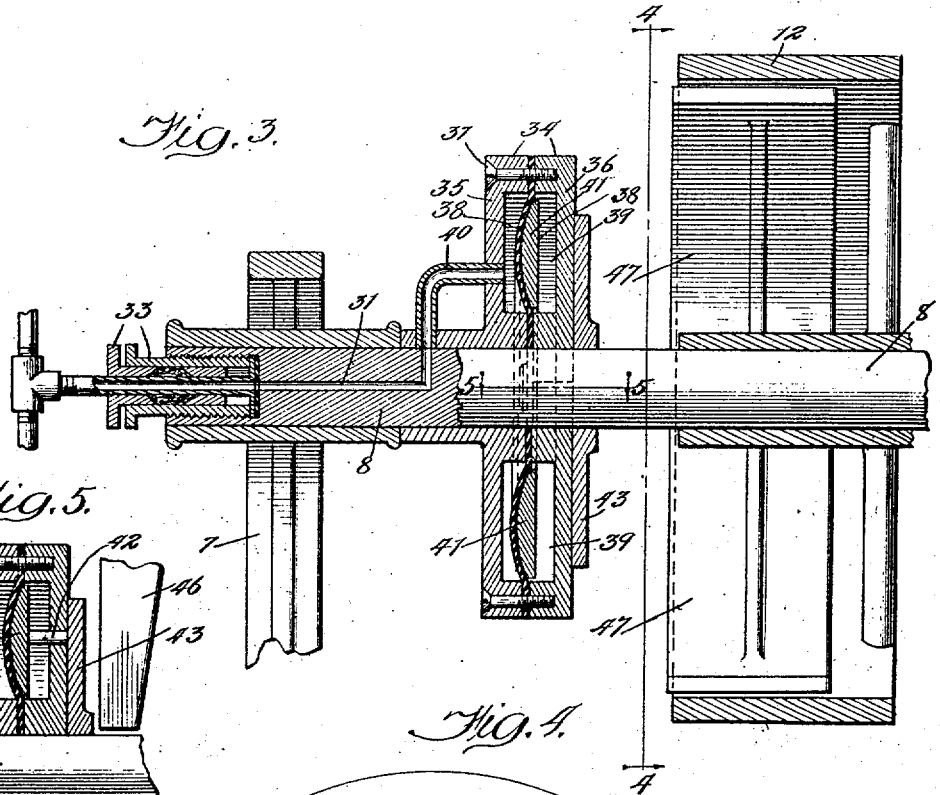
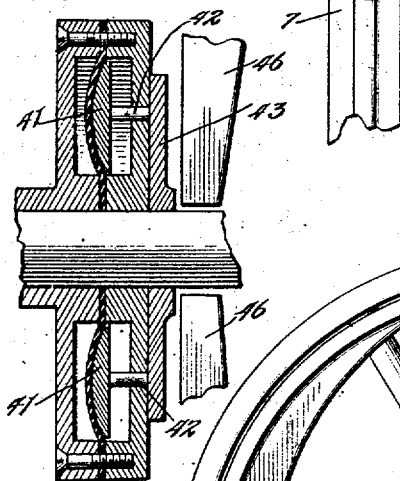
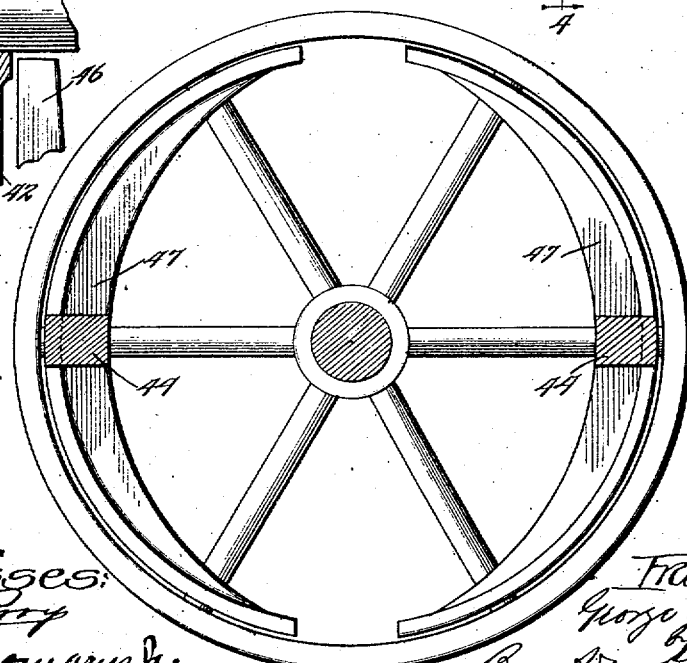

UNITED STATES PATENT OFFICE.

GEORGE F. LEIGER, OF CHICAGO, ILLINOIS.

SPEED-REGULATING MECHANISM.

REISSUED

No. 857,636.　　　　Specification of Letters Patent.　　　　Patented June 25, 1907.

Application filed March 11, 1907. Serial No. 361,673.

*To all whom it may concern:*

Be it known that I, GEORGE F. LEIGER, a citizen of the United States, residing at Chicago, in the county of Cook, State of Illinois, have invented certain new and useful Improvements in Speed - Regulating Mechanism, of which the following is a specification, reference being had to the accompanying drawings.

My invention relates to speed regulating mechanism for shafts and similarly rotating members, and its object is to provide a new and improved means by which the rotating speed of a driven member may be regulated. More particularly, its object is to provide mechanism controlled by fluid pressure by means of which the speed of rotation of a rotating member, when once it attains a given speed of rotation, may be automatically maintained at and be prevented from exceeding that predetermined speed, regardless of temporary excesses of speed in the driving member or mechanism; to provide fluid pressure controlled mechanism by means of which the mechanism may be readily and conveniently regulated to adjust it for any predetermined speed, and by means of which the speed of the driven member may be varied at pleasure to any speed up to the speed of the driving member, and may be automatically maintained at any such speed.

To that end my invention consists broadly in a pulley or similar revoluble member which may be either a driving or a driven pulley, a shaft upon which said pulley is loosely mounted, clutch members adapted to effect an engagement between said pulley and said shaft, mechanism operated by fluid pressure by means of which the clutch members may be caused to effect an engagement between said pulley and said shaft at any desired pressure, centrifugally operated members adapted to throw such clutch members out of engagement against the action of said fluid pressure when a predetermined speed of rotation is reached, and means by which the degree of pressure of said fluid operated mechanism upon such clutch members may be varied at will and adjusted to any predetermined speed while the machine is running.

My mechanism is adapted to the operation of any mechanism or machine which is driven by a continuously running line shaft and whose speed it may be desired to automatically maintain at any desired point or to vary at will while the machine is running. It is also peculiarly adapted to the operation of electrical generators driven by gas engines,—especially such as are used for sparking, for instance, in automobiles,—and to other mechanisms adapted to be driven by gas engines whose speed often temporarily exceeds the speed at which the generator is desired or adapted to be run. It may of course, however, be used in any mechanism in which it is desired that the speed of the driven shaft shall be automatically prevented from exceeding a predetermined rate of revolution, and in any mechanism whose speed it is desired while the machine is running to vary and to automatically maintain as long as desired at any given point.

In the drawings:—Figure 1 is a side elevation of the machine. Fig. 2 is a top or plan view, partially in horizontal cross-section. Fig. 3 is a detail, being a vertical cross-section on line 3 3 of Fig. 2. Fig. 4 is a detail, being a cross-section on line 4 4 of Fig. 3. Fig. 5 is a detail, being a section on line 5 5 of Fig. 3.

Referring to the drawings, 6 7 indicate respectively the base and standards of a frame in which the mechanism is mounted.

8 indicates a shaft which is journaled in bearings 9 10 carried in the standards 7 of the frame.

11 indicates a pulley which is keyed or otherwise mounted upon one end of the shaft 8.

12 indicates a pulley loosely mounted upon the shaft 8. The inner surface of the pulley 12 is adapted to engage the clutch members hereinafter described. In the mechanism as I have shown it, the pulley 12 is driven by a belt (not shown) from any suitable line shaft or other source of power (not shown), and is therefore the driving member of the mechanism, while the shaft 8 with its pulley 11 is the driven member of the mechanism. This is the form in which I prefer to construct it, but it will of course be obvious that the pulley 11 may be connected with the line shaft or other source of power and become the driving member, and the pulley 12 the driven member of the mechanism without any change in function, operation or result.

13 indicates a worm gear which is rigidly mounted upon the hub 14 of the pulley 12 so as to rotate therewith.

15 indicates a gear which is keyed or otherwise secured to one end of a shaft 16 which is journaled in a suitable support 17 and sleeve 18 mounted upon the standard 7. The other end of the shaft 16 carries a crank plate 19 provided with a wrist-pin 20.

21 indicates a force pump of any approved form of construction which is mounted upon the base 6 and whose piston 22 is connected by means of a link 23 with the wrist-pin 20. It will be obvious that the pump 21 will be continuously operated while the driving pulley 12 is being operated.

24 indicates a pipe opening from the pump 21 and carrying a gage 25 which indicates the pressure of the air or other fluid produced by the pump 21.

26 indicates a connecting pipe connecting the pump 21 with a pipe 27 upon the upper end of which is mounted a safety valve 28. The safety valve 28 is of any ordinary and well-known type which may be adjusted by means of a thumb-screw 29 to automatically blow off when any desired pressure indicated by the gage 25 is passed, and which may be blown off or discharged manually by means of a lever 30. As this valve may be of any well-known type and is not itself the subject of my invention, it is believed that it is not necessary to further describe it here.

The end of the shaft 8 opposite to the pulley 11 and near the pipe 27 is centrally bored with an opening 31 which extends a suitable distance into the shaft and then turns at right angles, opening upon the periphery of the shaft 8 as is best shown in Fig. 3.

32 indicates a pipe which opens from the pipe 27 into a suitable stuffing-box 33 which is screwed into or otherwise mounted upon the end of the shaft 8. The stuffing-box 33 of course rotates with the shaft 8 around the pipe 32. The opening in the pipe 32 registers with the opening 31 in the shaft 8.

34 indicates a diaphragm-casing which is keyed or otherwise secured to the shaft 8 so as to rotate therewith. The diaphragm-casing 34 consists of two members 35 and 36 which are secured together by means of screws 37 so as to clamp tightly between them a flexible diaphragm 38 preferably composed of rubber belting material, although it may be constructed of any other suitable flexible material. The two members 35 36 of the diaphragm-casing 34 are so formed as to contain within them when together an annular chamber 39. The flexible diaphragm 38 is clamped between the two members 35 36 so as to be fluid tight.

40 indicates a bent tube one end of which opens through the member 35 into the chamber 39 of the diaphragm-casing, and the other end of which opens into the shaft 8 in register with the fluid passage 31 therein.

41 indicates an annular plate fitting loosely within the annular chamber 39 in the diaphragm-casing 34 so as to move freely therein, and adapted to be moved by the movement of the diaphragm 38, as hereinafter described.

42 indicates pins which are secured to the annular plate 41 and project outward through the member 36 of the diaphragm-casing 34 and bear against a plate 43 which is feathered up on the shaft 8.

Referring to Fig. 2 where these are best shown, 44 indicates levers which are pivotally mounted upon supports 45 formed integral with or secured to the diaphragm-casing 34. The levers 44 are provided with arms 46 which project inward toward the shaft 8 and are adapted to be engaged by the plate 43 as hereinafter described. 47 indicates clutch-members which are mounted upon the levers 44 and are adapted to engage the interior surface of the pulley 12. These clutch-members, as is best shown in Fig. 4, have their engaging surfaces in the form of an arc of a circle concentric with the inner surface of the pulley 12, in order that when they are forced against the inner surface of the pulley 12 they may operate as clutches to engage the same. 48 indicates weights which are mounted upon the outer ends of the levers 44 and are adapted, when the shaft 8 is rotated, to tend by centrifugal force to move outward and to throw the clutch-members 47 inward away from engagement with the pulley 12 and against the pressure of the plate 43 and diaphragm 38 when operated as hereinafter described, and to disengage the clutch-members from the pulley by centrifugal force when a predetermined speed of rotation is exceeded.

The operation of the above-described mechanism is as follows:—The pulley 12 being continuously driven from a line shaft or other source of power, the air-pump 21 will be continually operated to supply suitable air pressure to the air mechanism. It will be noted that as the pump is operated by the worm gear its mechanism will be suitably slow not to provide too rapid accumulation of pressure. The speed at which the machine is desired to run being determined, the safety valve 28 is adjusted by means of the thumb-screw 29 to blow off when the desired pressure indicated by the pressure gage 25 is exceeded. This pressure, of course, will be dependent, among other things, upon the weight of the weights 48 and their position upon the levers. We will assume for the sake of illustration that a pressure of five pounds to the square inch, as indicated in Fig. 2, will cause the centrifugal force of the weights 48 to disengage the clutch-members when the desired speed is exceeded. By means of the slow moving pump 21 and the valve 28, this pressure is constantly maintained. The pressure is communicated through the pipes 21, 26, 27 and 32, and through the opening 31 and pipe 40 into the chamber 39 upon the left-hand side of the diaphragm, as shown in Fig. 3. The diaphragm 38 is thereby forced against the annular plate 41, pushing the pins 42 outward and thereby sliding the plate 43 along the shaft 8 toward the arms 46 of the levers 44, which, being forced inward by the operation of the diaphragm and plate, force the clutch-members 47 into engagement with the inner surface of the pulley 12. The shaft 8, with its driving pulley 11, is thereby set in rotation. As soon as the desired predetermined speed is exceeded, however, the centrifugal action of the weights 48 will force the arms 46 outward, thereby forcing the plate 43 backward toward the diaphragm-casing and forcing the diaphragm 38 backward against the air-pressure in the chamber 39. The machine will thereby be automatically maintained at the predetermined speed. When it is desired to stop the machine, the pressure is blown off by means of the lever 30, and the driven shaft 8 will come to rest. It will, of course, be obvious that by increasing the pressure upon the diaphragm a greater speed of the shaft 8 may be obtained before the centrifugal action of the weights 48 will effect a disengagement between the clutch-members and the pulley 12, and this pressure may be varied and adjusted to any predetermined degree, as has been said above, by means of the safety or blow-off valve.

It will be obvious from the above description that the speed of the machine may be varied to run faster or slower without stopping the machine, and may be maintained at such varied speed at will by the adjustment of the air-pressure by means of the blow-off valve 28. If it is desired to increase the speed, the pressure at which the valve will blow off may be increased by operating the thumb-screw 29, and if it is desired to decrease the speed of the mechanism the pressure at which the valve will blow off may be decreased in the same manner; and all this may be done readily without stopping the machine.

I have shown and described my apparatus as operated by air pressure, and this is the mechanism which I prefer to use. It will be obvious, however, that it may be operated by any suitable fluid other than air, and I do not confine myself to the use of air as a pressure fluid. I have also described the pulley 12 as being driven from the line shaft,—said pulley being, therefore, the driving member of the mechanism,—and the shaft 8 and pulley 11 as being driven thereby, but, as has been said, it will be obvious that without departing from my invention or from its function or operation the pulley 11 and shaft 8 may be driven from the line shaft, making the pulley 12 the driven member whose speed it is desired to vary,—in which case the pump would, of course, be driven by the shaft 8 instead of by the pulley 12.

What I claim as my invention and desire to secure by Letters Patent is:—

1. The combination with a shaft, a loose pulley on said shaft, and a clutch-member adapted to effect an engagement between said shaft and said pulley, of fluid operated mechanism adapted to normally effect an engagement at a given pressure between such clutch-member and said pulley, and centrifugally operated mechanism adapted to effect a disengagement between said clutch-member and said pulley when a given speed of rotation is reached.

2. The combination with a shaft, a loose pulley on said shaft, and a clutch-member adapted to effect an engagement between said shaft and said pulley, of fluid operated mechanism adapted to normally effect an engagement at a given pressure between such clutch-member and said pulley, means for applying a predetermined pressure upon said fluid, and centrifugally operated mechanism tending to effect a disengagement against said pressure between said pulley and said clutch-member.

3. The combination with a shaft, a pulley loosely mounted on said shaft, clutch-members carried by said shaft and adapted to engage said pulley, and centrifugally operated mechanism adapted to disengage said clutch-members from said pulley, of fluid operated mechanism adapted to engage said clutch-members and force them into engagement with said pulley with a predetermined pressure.

4. The combination with a shaft, a pulley loosely mounted on said shaft, clutch-members carried by said shaft and adapted to engage said pulley, and centrifugally operated mechanism adapted to disengage said clutch-members from said pulley, of fluid operated mechanism adapted to engage said clutch-members and force them into engagement with said pulley with a predetermined pressure, and means for varying the pressure of said fluid-operated mechanism upon said clutch-members.

5. The combination with a shaft, a pulley loosely mounted on said shaft, clutch-members carried by said shaft and adapted to engage said pulley, and centrifugally operated mechanism adapted to disengage said clutch-members from said pulley, of a diaphragm-casing secured to said shaft, a flexible diaphragm carried by said diaphragm-casing, mechanism adapted to apply a fluid pressure upon said diaphragm, and mechanism intermediate said diaphragm and said clutch-members and adapted by the fluid pressure upon said diaphragm to effect an engagement between said clutch-members and said pulley.

6. The combination with a shaft, a pulley loosely mounted on said shaft, clutch-members carried by said shaft and adapted to engage said pulley, and centrifugally operated mechanism adapted to disengage said clutch-members from said pulley, of a diaphragm-casing secured to said shaft, a flexible diaphragm carried by said diaphragm-casing, mechanism adapted to apply a fluid pressure upon said diaphragm, mechanism intermediate said diaphragm and said clutch-members and adapted by the fluid pressure upon said diaphragm to effect an engagement between said clutch-members and said pulley, and means for varying the fluid pressure upon said diaphragm.

7. The combination with a shaft, a pulley loosely mounted on said shaft, clutch-members carried by said shaft and adapted to engage said pulley, and centrifugally operated mechanism adapted to disengage said clutch-members from said pulley, of a diaphragm-casing secured to said shaft, a flexible diaphragm carried by said diaphragm-casing, a pressure pump, means for operating said pump, connections between said pump and said diaphragm-casing and adapted to contain a fluid, means whereby the pressure of said fluid upon said diaphragm may be varied, and mechanism intermediate said diaphragm and said clutch-members whereby the pressure upon said diaphragm will effect an engagement between said clutch-members and said pulley.

8. The combination with a shaft, a pulley loosely mounted on said shaft, levers carried by said shaft, clutch-members on one end of said levers adapted to engage said pulley, and weights on the other ends of said levers adapted by centrifugal force to disengage said clutch-members from said pulley, of a diaphragm-casing secured to said shaft, a flexible diaphragm in said diaphragm-casing, means for applying a fluid pressure to said diaphragm, a plate slidingly mounted on said shaft and rotatable therewith and adapted to engage said levers, connections between said plate and said diaphragm and adapted when fluid pressure is applied to said diaphragm to move said plate against said levers and effect an engagement between said clutch-members and said pulley, means for applying fluid pressure to said diaphragm, and means whereby said fluid pressure may be varied.

GEORGE F. LEIGER.

Witnesses:
HENRY P. GALE,
WILLIAM H. DE BUSK.